(12) United States Patent
Zhou et al.

(10) Patent No.: US 10,923,070 B2
(45) Date of Patent: Feb. 16, 2021

(54) SIGNAL TRANSMISSION METHOD, RELATED TIMING CONTROLLER, SOURCE DRIVER AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Chengqi Zhou, Beijing (CN); Xin Wang, Beijing (CN); Xin Duan, Beijing (CN); Hao Zhu, Beijing (CN); Jieqiong Wang, Beijing (CN); Ming Chen, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/618,947

(22) PCT Filed: Jun. 4, 2018

(86) PCT No.: PCT/CN2018/089751
§ 371 (c)(1),
(2) Date: Dec. 3, 2019

(87) PCT Pub. No.: WO2018/223916
PCT Pub. Date: Dec. 13, 2018

(65) Prior Publication Data
US 2020/0090620 A1  Mar. 19, 2020

(30) Foreign Application Priority Data

Jun. 9, 2017  (CN) .......................... 201710433272.4

(51) Int. Cl.
*G09G 5/00* (2006.01)
*G06F 3/147* (2006.01)

(52) U.S. Cl.
CPC ............. *G09G 5/003* (2013.01); *G06F 3/147* (2013.01); *G09G 2310/0286* (2013.01); *G09G 2310/063* (2013.01)

(58) Field of Classification Search
CPC .......... G06F 3/147; G09G 5/003; G09G 5/18; G09G 2310/0286; G09G 2310/063
(Continued)

(56) References Cited

U.S. PATENT DOCUMENTS

2011/0058640 A1* 3/2011 Shang .................. G11C 19/184
377/64
2012/0139593 A1   6/2012 Saito
(Continued)

FOREIGN PATENT DOCUMENTS

EP        3076580 A1    10/2016
WO    2016185585 A1    11/2016

OTHER PUBLICATIONS

"Communication with Supplementary European Search Report", EP Application No. 18814166.7, dated Nov. 3, 2020, 15 pp.

*Primary Examiner* — Jacinta M Crawford
(74) *Attorney, Agent, or Firm* — Myers Bigel, P.A.

(57) ABSTRACT

A signal transmission method and related timing controller, source driver and display device are disclosed. The method includes scrambling a signal to be transmitted by a transmitting unit to obtain a scrambled signal. Each frame of the scrambled signal includes at least one first identification signal sequentially arranged in time domain, and a number of the first identification signals in the scrambled signal is equal to a number of the first identification signals in the scrambled signals of other transmitting units in the plurality of transmitting units. The method includes transmitting the (Continued)

scrambled signal to a corresponding receiving unit, where the first identification signal is configured to indicate linear feedback shift registers of the transmitting unit and the corresponding receiving unit to perform a reset operation, and after each collective reset operation is completed, the corresponding receiving unit outputs a display signal to the display panel.

20 Claims, 6 Drawing Sheets

(58) Field of Classification Search
USPC .......................................................... 345/201
See application file for complete search history.

(56) References Cited

U.S. PATENT DOCUMENTS

| 2014/0132575 A1* | 5/2014 | Yang ........................ G09G 5/00 |
| | | 345/204 |
| 2014/0160183 A1* | 6/2014 | Yang .................... G09G 3/2096 |
| | | 345/691 |
| 2014/0269954 A1 | 9/2014 | Whitby-Strevens |
| 2015/0222416 A1 | 8/2015 | Saito |
| 2016/0292426 A1 | 10/2016 | Gibart et al. |
| 2018/0151107 A1 | 5/2018 | Yabuki |

* cited by examiner

SIGNAL TRANSMISSION METHOD, RELATED TIMING CONTROLLER, SOURCE DRIVER AND DISPLAY DEVICE

CROSS REFERENCE TO RELATED APPLICATIONS

The present application is the U.S. national phase entry of PCT/CN2018/089751, with an international filling date of Jun. 4, 2018, which claims the benefit of Chinese Patent Application No. 201710433272.4, filed on Jun. 9, 2017, the entire disclosures of which are incorporated herein by reference.

TECHNICAL FIELD

The present application relates to the field of communication technology, and in particular to a signal transmission method, related timing controller, source driver and display device.

BACKGROUND

A display device may generally include a display panel and a panel driver for driving the display panel. The panel driver may include a timing controller, a gate driver, and a source driver.

In the related art, the timing controller includes a plurality of transmitting units, and the source driver includes a plurality of receiving units. The plurality of transmitting units are in one-to-one correspondence with the plurality of receiving units, and the plurality of receiving units are connected one-to-one with the plurality of columns of pixel units on the display panel. When it is required to control the display panel to display an image, the plurality of transmitting units in the timing controller can simultaneously transmit signals to the corresponding receiving units, so that each receiving unit inputs the display signal to the connected column of pixel units on the display panel based on the received signal. Each column of pixel units on the display panel emits light of a corresponding color based on the input display signal, causing the display panel to display an image. It should be noted that there is a noise signal on the path between each transmitting unit and the corresponding receiving unit, and the strengths of the noise signals on any two paths are different. When a transmitting unit transmits a signal to a corresponding receiving unit, a situation may occur in which the corresponding receiving unit can't receive the signal due to interference of a strong noise signal, and the transmitting unit needs to retransmit the signal to the corresponding receiving unit.

In the related art, there may be some of the plurality of receiving units that require the transmitting units to retransmit the signals, and other receiving units do not require the transmitting units to retransmit the signals. This causes the plurality of receiving units receive the signals at different time, and therefore the plurality of receiving units output the display signals to the connected pixel units at different time, so that the image displayed by the display panel may be corrugated. Therefore, the display panel has a poor display effect.

SUMMARY

It is an object of the present disclosure to address one or more of the above problems.

According to a first aspect of the present disclosure, there is provided a signal transmission method applied to any one of a plurality of transmitting units of a timing controller, the plurality of transmitting units are in one-to-one correspondence with a plurality of receiving units of a source driver, each of the plurality of transmitting units includes a first linear feedback shift register and each of the plurality of receiving units includes a second linear feedback shift register, the method includes:

scrambling a signal to be transmitted with the first linear feedback shift register in the transmitting unit to obtain a scrambled signal, wherein each frame of the scrambled signal includes at least one first identification signal sequentially arranged in time domain, and a number of the first identification signals in the scrambled signal is equal to a number of the first identification signals in the scrambled signals of other transmitting units in the plurality of transmitting units;

transmitting the scrambled signal to a corresponding receiving unit, so that the corresponding receiving unit outputs a display signal to a display panel based on the scrambled signal;

wherein the first identification signal is configured to indicate the first and second linear feedback shift registers to perform a reset operation, and after each collective reset operation is completed, the corresponding receiving unit outputs the display signal to the display panel; the collective reset operation representing that all of the second linear feedback shift registers of the source driver perform reset operations indicated by the first identification signals in the same order.

In an embodiment, said scrambling the signal to be transmitted to obtain the scrambled signal includes:

scrambling a non-identification signal in the signal to be transmitted with the first linear feedback shift register in the transmitting unit to obtain the scrambled signal, the scrambled signal including an identification signal and a scrambled non-identification signal;

wherein the signal to be transmitted is scrambled by the first linear feedback shift register using one of multi-order polynomials $X^{16}+X^5+X^4+X^3+1$, $X^{24}+X^4+X^3+X+1$ and $X^{32}+X^7+X^5+X^3+X^2+X+1$.

In an embodiment, the signal to be transmitted includes: a plurality of signal segments before scrambling and the at least one first identification signal, the plurality of signal segments before scrambling are sequentially arranged in time domain, and there is one first identification signal of the at least one first identification signal between any two adjacent signal segments of the plurality of signal segments before scrambling, and wherein said scrambling the signal to be transmitted to obtain the scrambled signal includes:

scrambling the non-identification signal in each of the plurality of signal segments before scrambling in sequence to obtain the scrambled signal, wherein the scrambled signal includes: a plurality of scrambled signal segments and the at least one first identification signal, the plurality of scrambled signal segments are sequentially arranged in time domain, and there is one first identification signal of the at least one first identification signal between any two adjacent signal segments of the plurality of scrambled signal segments.

In an embodiment, in the signals to be transmitted of any two of the transmitting units, positions of the first identification signals in time domain are different.

In an embodiment, the plurality of receiving units are connected one-to-one with a plurality of columns of pixel units in the display panel, and the first linear feedback shift registers in two transmitting units which correspond to two receiving units connected with any two adjacent columns of the pixel units are different.

In an embodiment, the signal to be transmitted includes: a plurality of frames of signal across a plurality of frames of image, each of the plurality of frames of signal includes a plurality of row signals, wherein each of the plurality of row signals includes: a start identification signal and a cutoff identification signal as identification signals, and a control package signal, a video line package signal and an idle package as non-identification signals, the start identification signal being configured to indicate a start position of each of the row signals, the cutoff identification signal being configured to indicate a cutoff position of each of the row signals; and wherein there is at least one target cutoff identification signal in a plurality of cutoff identification signals of each frame of signal, and each target cutoff identification signal is used as the first identification signal.

In an embodiment, each of the identification signals in each of the row signals includes at least eleven consecutive bits.

In an embodiment, each of the identification signals includes four consecutive bit units, and each of the bit units includes ten bits.

In an embodiment, there are at least two bits of different values in each of the bit units.

In an embodiment, there are six consecutive bits of the same value in each of the identification signals.

In an embodiment, the scrambled signal includes: the first identification signal between any two adjacent frames of the scrambled signal.

According to a second aspect of the present disclosure, there is provided a signal transmission method applied to any one of a plurality of receiving units of a source driver, the plurality of receiving units are in one-to-one correspondence with a plurality of transmitting units of a timing controller, each of the transmitting units includes a first linear feedback shift register and each of the receiving units includes a second linear feedback shift register, the method includes:

receiving a signal transmitted by a corresponding transmitting unit, wherein the signal is a scrambled signal obtained by scrambling a signal to be transmitted with the first linear feedback shift register of the corresponding transmitting unit, and each frame of the scrambled signal includes: at least one first identification signal sequentially arranged in time domain, and a number of the first identification signals in the scrambled signal is equal to a number of the first identification signals in the scrambled signals received by other receiving units in the plurality of receiving units; the first identification signal is configured to indicate the first and second linear feedback shift registers to perform a reset operation, and after each collective reset operation is completed, the receiving unit outputs a display signal to a display panel, the collective reset operation representing that all of the second linear feedback shift registers of the source driver perform reset operations indicated by the first identification signals in the same order;

controlling the second linear feedback shift register in the receiving unit to perform the reset operation based on the received first identification signal;

descrambling the scrambled signal to obtain a signal before scrambling;

outputting the display signal to the display panel based on the signal before scrambling after each collective reset operation is completed.

In an embodiment, the scrambled signal is a signal obtained by scrambling a non-identification signal in the signal to be transmitted with the first linear feedback shift register of the transmitting unit, the scrambled signal including an identification signal and a scrambled non-identification signal; and wherein descrambling the scrambled signal to obtain the signal before scrambling includes:

descrambling the scrambled signal to obtain the signal before scrambling with the second linear feedback shift register in the receiving unit;

wherein the signal to be transmitted is scrambled by the first linear feedback shift register using one of multi-order polynomials $X^{16}+X^5+X^4+X^3+1$, $X^{24}+X^4+X^3+X+1$ and $X^{32}+X^7+X^5+X^3+X^2+X+1$, a scrambling order of the signals by the first linear feedback shift register is opposite to a descrambling order of the signals by the second linear feedback shift register.

In an embodiment, the scrambled signal includes: a plurality of scrambled signal segments and the at least one first identification signal, wherein the plurality of scrambled signal segments are sequentially arranged in time domain, and there is one first identification signal of the at least one first identification signal between any two adjacent signal segments of the plurality of scrambled signal segments; and wherein descrambling the scrambled signal to obtain the signal before scrambling includes:

descrambling the non-identification signal in each of the plurality of scrambled signal segments in sequence to obtain the signal before scrambling; wherein the signal before scrambling includes: a plurality of signal segments before scrambling and the at least one first identification signal, wherein the plurality of signal segments before scrambling are sequentially arranged in time domain, and there is one first identification signal of the at least one first identification signal between any two adjacent signal segments of the plurality of signal segments before scrambling.

In an embodiment, in the scrambled signal received by any two of the receiving units, positions of the first identification signals in time domain are different.

In an embodiment, the plurality of receiving units are connected one-to-one with a plurality of columns of pixel units in the display panel, and the second linear feedback shift registers in two receiving units connected by any two adjacent columns of the pixel units are different.

In an embodiment, the signal to be transmitted includes: a plurality of frames of signal across a plurality of frames of image, each of the plurality of frames of signal includes a plurality of row signals, wherein each of the plurality of row signals includes: a start identification signal and a cutoff identification signal as identification signals, and a control package signal, a video line package signal and an idle package as non-identification signals, the start identification signal being configured to indicate a start position of each of the row signals, the cutoff identification signal being configured to indicate a cutoff position of each of the row signals; and wherein there is at least one target cutoff identification signal in a plurality of cutoff identification signals of each frame of signal, and each target cutoff identification signal is used as the first identification signal.

In an embodiment, each of the identification signals in each of the row signals includes at least eleven consecutive bits.

In an embodiment, each of the identification signals includes four consecutive bit units, and each of the bit units includes ten bits.

In an embodiment, there are at least two bits of different values in each of the bit units.

In an embodiment, there are six consecutive bits of the same value in each of the identification signals.

In an embodiment, the scrambled signal includes: the first identification signal between any two adjacent frames of the scrambled signal.

According to a third aspect of the present disclosure, there is provided a timing controller including a plurality of transmitting units, the plurality of transmitting units are in one-to-one correspondence with a plurality of receiving units of a source driver, each transmitting unit includes:

a first linear feedback shift register configured to scramble a signal to be transmitted to obtain a scrambled signal, wherein each frame of the scrambled signal includes at least one first identification signal sequentially arranged in time domain, and a number of the first identification signals in the scrambled signal is equal to a number of the first identification signals in the scrambled signals of other transmitting units in the plurality of transmitting units;

a transmitter configured to transmit the scrambled signal to a corresponding receiving unit, so that the corresponding receiving unit outputs a display signal to a display panel based on the scrambled signal;

wherein the first identification signal is configured to indicate the first linear feedback shift register and a second linear feedback shift register included by the corresponding receiving unit to perform a reset operation, and after each collective reset operation is completed, the corresponding receiving unit outputs the display signal to the display panel; the collective reset operation representing that all of the second linear feedback shift registers of the source driver perform reset operations indicated by the first identification signals in the same order.

In an embodiment, the first linear feedback shift register is further configured to:

scramble a non-identification signal in the signal to be transmitted to obtain the scrambled signal, the scrambled signal including: an identification signal and a scrambled non-identification signal;

wherein the signal to be transmitted is scrambled by the first linear feedback shift register using one of multi-order polynomials $X^{16}+X^5+X^4+X^3+1$, $X^{24}+X^4+X^3+X+1$ and $X^{32}+X^7+X^5+X^3+X^2+X+1$.

In an embodiment, the signal to be transmitted includes: a plurality of signal segments before scrambling and the at least one first identification signal, the plurality of signal segments before scrambling are sequentially arranged in time domain, and there is one first identification signal of the at least one first identification signal between any two adjacent signal segments of the plurality of signal segments before scrambling, the first linear feedback shift register is further configured to: scramble the non-identification signal in each of the plurality of signal segments before scrambling in sequence to obtain the scrambled signal, wherein the scrambled signal includes: a plurality of scrambled signal segments and the at least one first identification signal, the plurality of scrambled signal segments are sequentially arranged in time domain, and there is one first identification signal of the at least one first identification signal between any two adjacent signal segments of the plurality of scrambled signal segments.

In an embodiment, in the signals to be transmitted of any two of the transmitting units, positions of the first identification signals in time domain are different.

In an embodiment, the plurality of receiving units are connected one-to-one with a plurality of columns of pixel units in the display panel, and the first linear feedback shift registers in two transmitting units which correspond to two receiving units connected with any two adjacent columns of the pixel units are different.

In an embodiment, the signal to be transmitted includes: a plurality of frames of signal across a plurality of frames of image, each of the plurality of frames of signal includes a plurality of row signals, wherein each of the plurality of row signals includes: a start identification signal and a cutoff identification signal as identification signals, and a control package signal, a video line package signal and an idle package as non-identification signals, the start identification signal being configured to indicate a start position of each of the row signals, the cutoff identification signal being configured to indicate a cutoff position of each of the row signals; and there is at least one target cutoff identification signal in a plurality of cutoff identification signals of each frame of signal, and each target cutoff identification signal is used as the first identification signal.

In an embodiment, each of the identification signals in each of the row signals includes at least eleven consecutive bits.

In an embodiment, each of the identification signals includes four consecutive bit units, and each of the bit units includes ten bits.

In an embodiment, there are at least two bits of different values in each of the bit units.

In an embodiment, there are six consecutive bits of the same value in each of the identification signals.

In an embodiment, the scrambled signal includes: the first identification signal between any two adjacent frames of the scrambled signal.

According to a fourth aspect of the present disclosure, there is provided a source driver including a plurality of receiving units, the plurality of receiving units being in one-to-one correspondence with a plurality of transmitting units of a timing controller, each of the transmitting units including a first linear feedback shift register, and each of the receiving units including a receiver, a controller, a second linear feedback shift register, and an output, wherein the receiver is configured to receive a signal transmitted by a corresponding transmitting unit, wherein the signal is a scrambled signal obtained by scrambling a signal to be transmitted with the first linear feedback shift register of the corresponding transmitting unit; each frame of the scrambled signal includes: at least one first identification signal sequentially arranged in time domain, and a number of the first identification signals in the scrambled signal is equal to a number of the first identification signals in the scrambled signals received by other receiving units in the plurality of receiving units; the first identification signal is configured to indicate the first and second linear feedback shift registers to perform a reset operation, and after each collective reset operation is completed, the receiving unit outputs a display signal to a display panel, the collective reset operation representing that all of the second linear feedback shift registers of the source driver perform reset operations indicated by the first identification signals in the same order;

the controller is configured to control the second linear feedback shift register in the receiving unit to perform the reset operation based on the received first identification signal;

the second linear feedback shift register is configured to descramble the received scrambled signal to obtain a signal before scrambling; and the output is configured to output the display signal to the display panel based on the signal before scrambling after each collective reset operation is completed.

In an embodiment, the scrambled signal is a signal obtained by scrambling a non-identification signal in the signal to be transmitted with a first linear feedback shift register of the corresponding transmitting unit, the scrambled signal including an identification signal and a scrambled non-identification signal, wherein the signal to be transmitted is scrambled by the first linear feedback shift register using one of multi-order polynomials $X^{16}+X^5+X^4+X^3+1$, $X^{24}+X^4+X^3+X+1$ and $X^{32}+X^7+X^5+X^3+X^2+X+1$, a scrambling order of the signals by the first linear feedback shift register is opposite to a descrambling order of the signals by the second linear feedback shift register.

In an embodiment, the scrambled signal includes: a plurality of scrambled signal segments and the at least one first identification signal, wherein the plurality of scrambled signal segments are sequentially arranged in time domain, and there is one first identification signal of the at least one first identification signal between any two adjacent signal segments of the plurality of scrambled signal segments;

the second linear feedback shift register is further configured to: descramble the non-identification signal in each of the plurality of scrambled signal segments in sequence to obtain the signal before scrambling; the signal before scrambling includes: a plurality of signal segments before scrambling and the at least one first identification signal, wherein the plurality of signal segments before scrambling are sequentially arranged in time domain, and there is one first identification signal of the at least one first identification signal between any two adjacent signal segments of the plurality of signal segments before scrambling.

In an embodiment, in the scrambled signal received by any two of the receiving units, positions of the first identification signals in time domain are different.

In an embodiment, the plurality of receiving units are connected one-to-one with a plurality of columns of pixel units in the display panel, and the second linear feedback shift registers in two receiving units connected by any two adjacent columns of the pixel units are different.

In an embodiment, the signal to be transmitted includes: a plurality of frames of signal across a plurality of frames of image, each of the plurality of frames of signal includes a plurality of row signals, wherein each of the plurality of row signals includes: a start identification signal and a cutoff identification signal as identification signals, and a control package signal, a video line package signal and an idle package as non-identification signals, the start identification signal being configured to indicate a start position of each of the row signals, the cutoff identification signal being configured to indicate a cutoff position of each of the row signals; and wherein there is at least one target cutoff identification signal in a plurality of cutoff identification signals of each frame of signal, and each target cutoff identification signal is used as the first identification signal.

In an embodiment, each of the identification signals in each of the row signals includes at least eleven consecutive bits.

In an embodiment, each of the identification signals includes four consecutive bit units, and each of the bit units includes ten bits.

In an embodiment, there are at least two bits of different values in each of the bit units.

In an embodiment, there are six consecutive bits of the same value in each of the identification signals.

In an embodiment, the scrambled signal includes: the first identification signal between any two adjacent frames of the scrambled signal.

According to a fifth aspect of the present disclosure, there is provided a display device including:
any of the timing controllers described above, and
any of the source drivers described above,
wherein the plurality of transmitting units in the timing controller are in one-to-one correspondence with the plurality of receiving units in the source driver.

According to a sixth aspect of the present disclosure, there is provided a computer readable storage medium having stored thereon instructions that, when executed on a computer, perform any of the methods of the first aspect or the second aspect.

BRIEF DESCRIPTION OF THE DRAWINGS

For a better understanding of the objects, features, and advantages of the present disclosure, embodiments of the present disclosure will be described below by way of illustration rather than limitation with reference to the accompanying drawings.

DETAILED DESCRIPTION OF THE DISCLOSURE

In order to make the objects, technical solutions and advantages of the present application more clear, embodiments of the present application will be further described in detail below with reference to the accompanying drawings.

Figure 1:
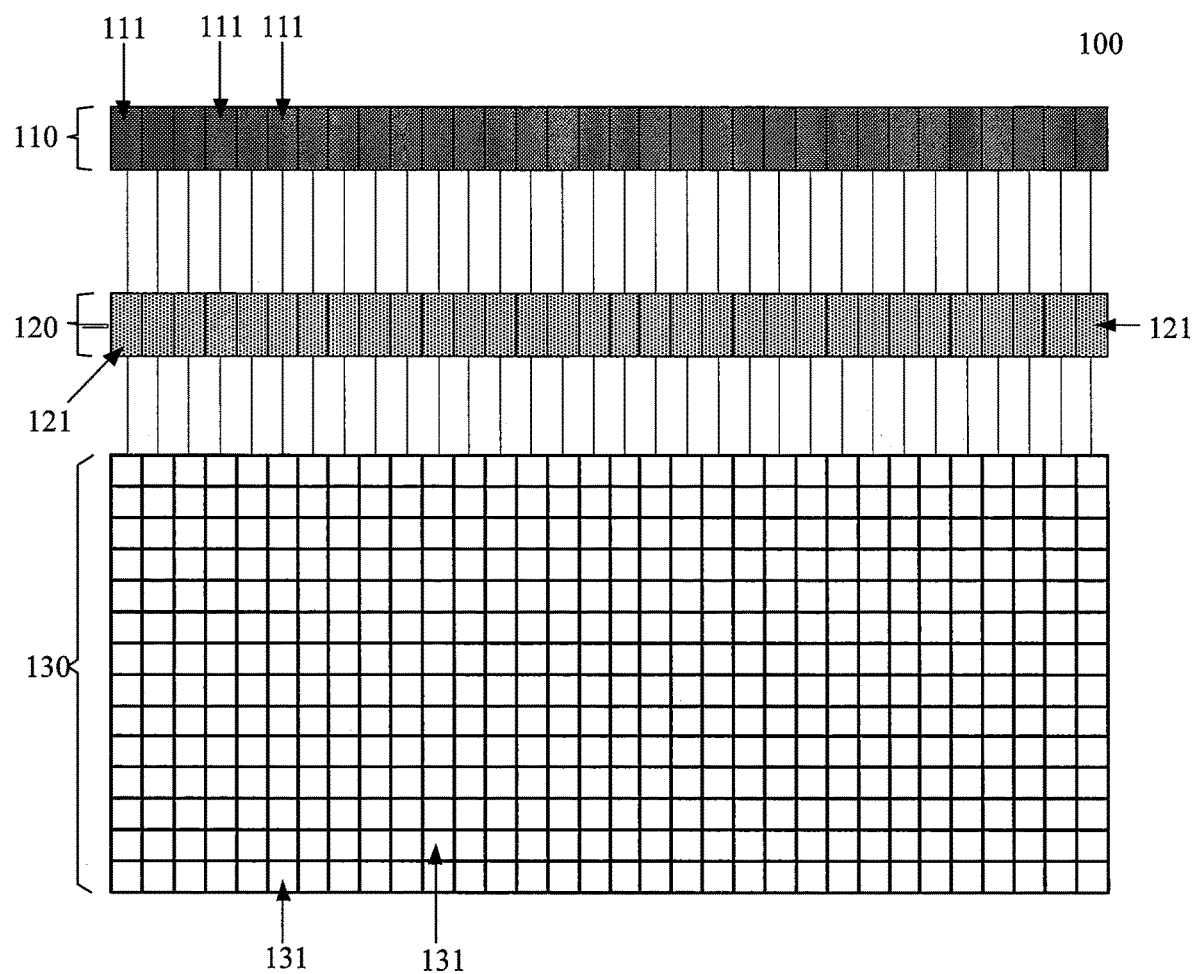
FIG. 1 is a schematic structural diagram of a display device according to an embodiment of the present disclosure.

FIG. 1 is a schematic structural diagram of a display device 100 according to an embodiment of the present disclosure. As shown in FIG. 1, the display device may include a timing controller 110 and a source driver 120. The timing controller 110 includes a plurality of transmitting units 111. The source driver 120 includes a plurality of receiving units 121, and the plurality of transmitting units 111 of the timing controller 110 are connected in one-to-one correspondence with the plurality of receiving units 121 of the source driver 120. That is, the plurality of transmitting units 111 and the plurality of receiving units 121 may transmit signals in a point-to-point (P2P) transmission mode.

As an example, the timing controller 110 may be provided with a plurality of ports, and each port may be provided with at least one lane. That is, the timing controller 110 may be provided with a plurality of lanes, and the plurality of transmitting units 111 of the timing controller 110 are connected in one-to-one correspondence with the plurality of lanes. The source driver 120 may include a plurality of source driver chips (not shown in FIG. 1). Each source driver chip is provided with a plurality of ports, and each port may include at least one lane. That is, the source driver 120 may be provided with a plurality of lanes, and the plurality of receiving units 121 are connected in one-to-one correspondence with the plurality of lanes. Further, the plurality of lanes disposed on the timing controller 110 are also connected in one-to-one correspondence with the plurality of lanes disposed on the source driver 120 by signal lines, making the plurality of transmitting units 111 in the timing controller 110 and the plurality of receiving units 121 in the source driver 120 respectively connected in one-to-one correspondence through the ports on the timing controller 110, the signal lines, and the ports on the source driver.

Referring to FIG. 1, the display device may further include a display panel 130. The display panel 130 may be provided with a plurality of pixel units 131 arranged in an array. Each of the pixel units 131 includes a thin film transistor and a pixel electrode connected to each other. The plurality of pixel units 131 may form a plurality of columns of pixel units, and the plurality of columns of pixel units may be connected in one-to-one correspondence with the plurality of receiving units 121 of the source driver 120. In an embodiment, the display device may also include a gate driver (not shown in FIG. 1).

As an example, the display device may be any product or component that has a display function such as a liquid crystal panel, an electronic paper, an organic light emitting diode (OLED) panel, a mobile phone, a tablet computer, a television, a display, a notebook computer, a digital photo frame, and a navigation device.

Figure 2:
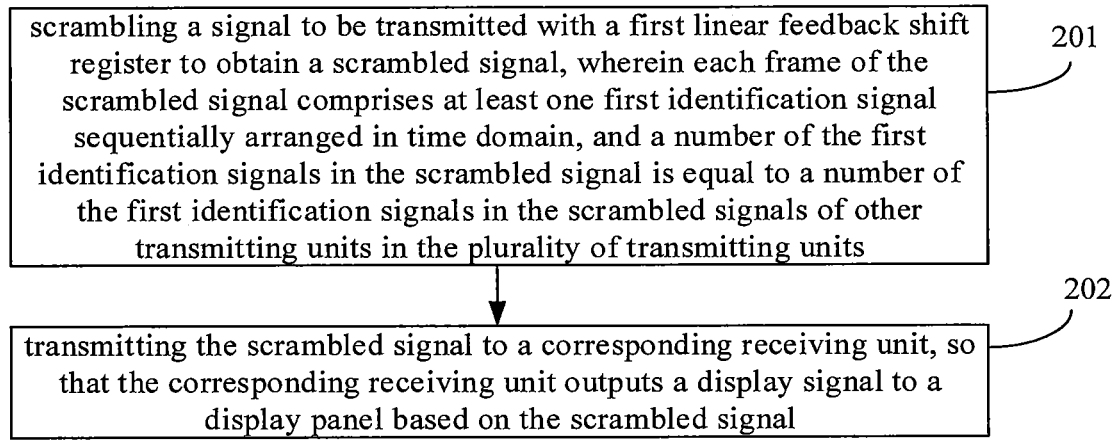
FIG. 2 is a flowchart of a signal transmission method according to an embodiment of the present disclosure.

FIG. 2 is a flowchart of a signal transmission method used in a display device according to an embodiment of the present disclosure. The signal transmission method may be applied to any one of the plurality of transmitting units 111 of the timing controller 110 in FIG. 1, and the plurality of transmitting units 111 are in one-to-one correspondence with the plurality of receiving units 121 of the source driver 120. Each transmitting unit includes a first linear feedback shift register and each receiving unit includes a second linear feedback shift register. It will be understood that the method may be implemented in conjunction with any suitable hardware, software, firmware, or combination thereof. In at least some embodiments, the method may be performed by software in the form of computer readable instructions embodied on a type of computer readable storage medium, which may be executed under the influence of one or more processors. As shown in FIG. 2, the signal transmission method may include:

step 201: scrambling a signal to be transmitted with a first linear feedback shift register to obtain a scrambled signal, wherein each frame of the scrambled signal comprises at least one first identification signal sequentially arranged in time domain, and a number of the first identification signals in the scrambled signal is equal to a number of the first identification signals in the scrambled signals of other transmitting units in the plurality of transmitting units;

step 202: transmitting the scrambled signal to a corresponding receiving unit, so that the corresponding receiving unit outputs a display signal to a display panel based on the scrambled signal;

wherein the first identification signal is configured to indicate the first and second linear feedback shift registers to perform a reset operation, and after each collective reset operation is completed, the corresponding receiving unit outputs the display signal to the display panel; the collective reset operation represents that all of the second linear feedback shift registers of the source driver perform reset operations indicated by the first identification signals in the same order;

In summary, in the signal transmission method provided by embodiments of the present disclosure, when the plurality of receiving units receive the scrambled signals at different time, the plurality of receiving units receive the first identification signals at different time. The receiving units output the display signals to the display panel after each collective reset operation is completed. That is, after performing the reset operation based on the first identification signal, each receiving unit will not output the display signal to the display panel until other receiving units complete the reset operation. Therefore, the time difference between the output signals of the plurality of receiving units to the display panel is reduced, and the display effect of the display panel is improved.

Figure 3:
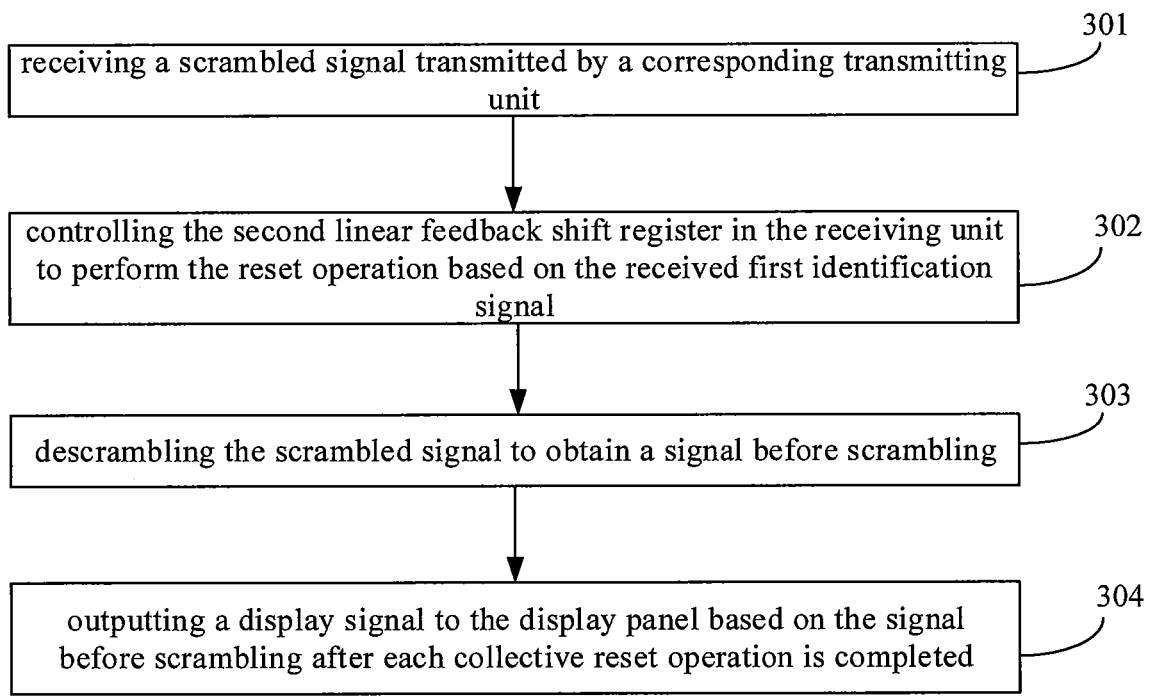
FIG. 3 is a flowchart of another signal transmission method according to an embodiment of the present disclosure.

FIG. 3 is a flowchart of another signal transmission method according to an embodiment of the present disclosure. The signal transmission method may be applied to any one of the plurality of receiving units 121 of the source driver 120 in FIG. 1, and the plurality of receiving units 121 are in one-to-one correspondence with the plurality of transmitting units 111 of the timing controller 110. Each transmitting unit includes a first linear feedback shift register and each receiving unit includes a second linear feedback shift register. It will be understood that the method may be implemented in conjunction with any suitable hardware, software, firmware, or combination thereof. In at least some embodiments, the method may be performed by software in the form of computer readable instructions embodied on a type of computer readable storage medium, which may be executed under the influence of one or more processors. As shown in FIG. 3, the signal transmission method may include:

step 301: receiving a scrambled signal transmitted by a corresponding transmitting unit. Each frame of the scrambled signal comprises: at least one first identification signal sequentially arranged in time domain, and a number of the first identification signals in the scrambled signal is equal to a number of the first identification signals in the scrambled signals received by other receiving units in the plurality of receiving units; the first identification signal is configured to indicate the first and second linear feedback shift registers to perform a reset operation, and after each collective reset operation is completed, the corresponding receiving unit outputs a display signal to a display panel, the collective reset operation representing that all of the second linear feedback shift registers of the source driver perform reset operations indicated by the first identification signals in the same order.

step 302: controlling the second linear feedback shift register in the receiving unit to perform the reset operation based on the received first identification signal;

step 303: descrambling the scrambled signal to obtain a signal before scrambling.

step 304: outputting a display signal to the display panel based on the signal before scrambling after each collective reset operation is completed.

In summary, in the signal transmission method provided by embodiments of the present disclosure, when the plurality of receiving units receive the scrambled signals at different time, the plurality of receiving units receive the first identification signals at different time. The receiving units output display signals to the display panel after each collective reset operation is completed. That is, after performing the reset operation based on the first identification signal, each receiving unit will not output the display signal to the display panel until other receiving units complete the reset operation. Therefore, the time difference between the output signals of the plurality of receiving units to the display panel is reduced, and the display effect of the display panel is improved.

Figure 4:
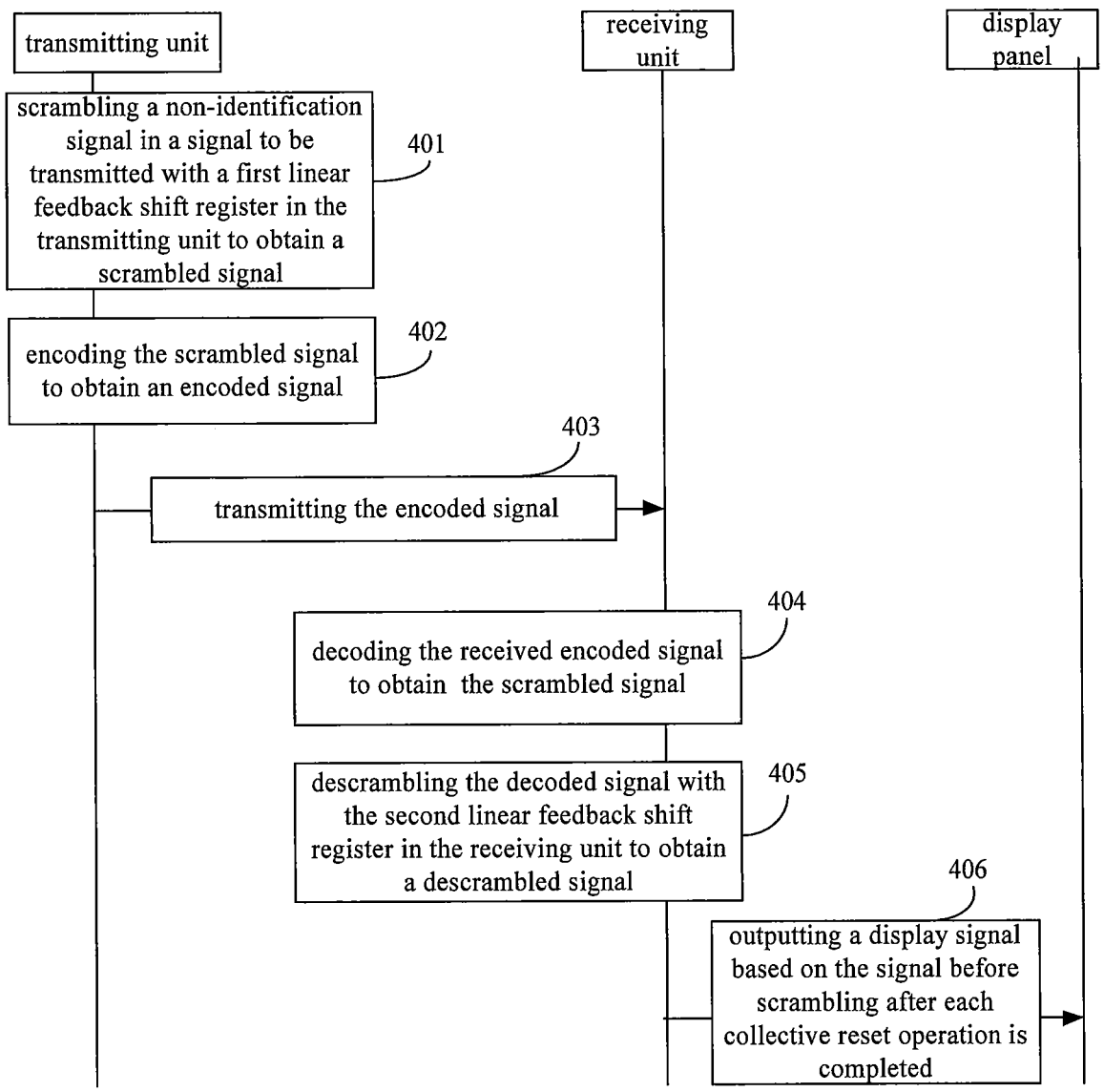
FIG. 4 is a flowchart of still another signal transmission method according to an embodiment of the present disclosure.

FIG. 4 is a flowchart of still another signal transmission method according to an embodiment of the present disclosure. It will be understood that the method may be implemented in conjunction with any suitable hardware, software, firmware, or combination thereof. In at least some embodiments, the method may be performed by software in the form of computer readable instructions embodied on a type of computer readable storage medium, which may be executed under the influence of one or more processors. As shown in FIG. 4, the signal transmission method may include steps 401-406.

At step 401, a transmitting unit in a timing controller scrambles a non-identification signal in a signal to be transmitted with a first linear feedback shift register in the transmitting unit to obtain a scrambled signal.

Figure 5:
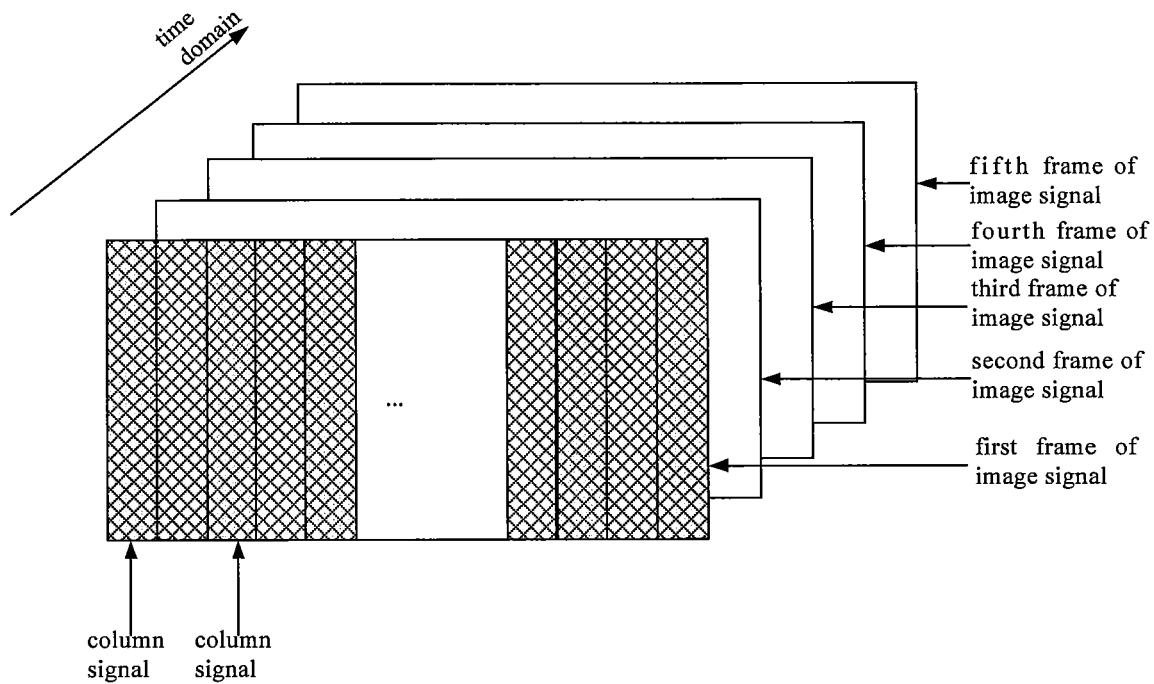
FIG. 5 is a schematic diagram of a video image signal according to an embodiment of the present disclosure.

As an example, FIG. 5 is a schematic diagram of a video image signal according to an embodiment of the present disclosure. The video image signal as shown in FIG. 5 may be stored on the timing controller, and the video image signal may include a plurality of frames of consecutive image signals in time domain (for example, FIG. 5 shows five frames of image signal). Each frame of image signal may include a plurality of column signals one-to-one corresponding to the plurality of transmitting units (only a plurality of column signals in the first frame of image signal are shown in FIG. 5). A plurality of column signals corresponding to the same transmitting unit in the plurality of frames of image signal are consecutive in time domain. When it is required to control the display panel to display the video image, each transmitting unit in the timing controller needs to sequentially transmit the plurality of column signals corresponding to the transmitting unit to the receiving unit corresponding to the transmitting unit. A plurality of column signals corresponding to each transmitting unit are signals to be transmitted by the transmitting unit. Since a plurality of transmitting units generally simultaneously transmit signals to corresponding receiving units, in order to prevent electromagnetic interference between a plurality of signals during transmission, in the embodiments of the present disclosure, the transmitting units need to scramble the signals to be transmitted before transmitting the signals to the receiving unit.

It should be noted that each of the transmitting units 111 in FIG. 1 includes a first linear feedback shift register, which may be configured to scramble a signal. As an example, a scrambled signal obtained by scrambling a signal X with the first linear feedback shift register includes but is not limited to: $X^{16}+X^5+X^4+X^3+1$, $X^{24}+X^4+X^3+X+1$ and $X^{32}+X^7+X^5+X^3+X^2+X+1$. That is, the signal to be transmitted is scrambled by the first linear feedback shift register using one of multi-order polynomials $X^{16}+X^5+X^4+X^3+1$, $X^{24}+X^4+X^3+X+1$ and $X^{32}+X^7+X^5+X^3+X^2+X+1$. In practical applications, the signal obtained by scrambling the signal X with the first linear feedback shift register may also be other multi-order polynomials including X. In some embodiments, when the signals to be transmitted by two transmitting units are similar, the signal to be transmitted by each transmitting unit is scrambled by using the first linear feedback shift register, so that the obtained two scrambled signals have a large difference, thereby converting two similar signals to be transmitted into two signals with a large difference. The two signals with a large difference have less electromagnetic interference between them during transmission, so that the electromagnetic interference of the two transmitting units when transmitting the two signals with a large difference is reduced.

Further, the signal to be transmitted by each transmitting unit may include a plurality of frames of signal across a plurality of frames of image (that is, the column signals corresponding to the same transmitting unit in the plurality of frames of image signal in FIG. 5). Each of the plurality of frames of signal may include a plurality of row signals. It should be noted that each transmitting unit corresponds to a receiving unit, and each receiving unit corresponds to a column of pixel units on the display panel. Each frame of signal to be transmitted by each transmitting unit is a signal that needs to be input to a column of pixel units on the display panel, and the plurality of row signals in each frame of signal are signals that need to be input to a plurality of pixels units in the column of pixel units (i.e., a plurality of rows of pixel units in the column of pixel units).

Figure 6:
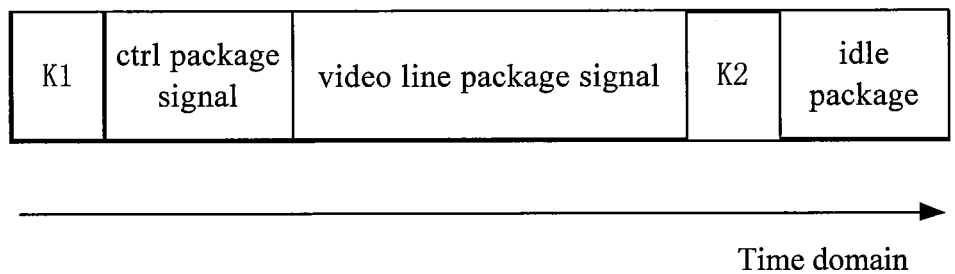
FIG. 6 is a schematic diagram of a row signal according to an embodiment of the present disclosure.

FIG. 6 is a schematic diagram of a row signal according to an embodiment of the present disclosure. As shown in FIG. 6, each of the plurality of row signals may include: a start identification signal K1, a control (ctrl) package signal, a video line package signal, a cutoff identification signal K2 and an idle package signal. The start identification signal K1 is configured to indicate the start position of each row signal, and the cutoff identification signal K2 is configured to indicate the cutoff position of each row signal. The control package signal may also be referred to as a control-line (ctrl-1) package signal, and the control package signals in the signals to be transmitted by each transmitting unit are the same. The identification signals in each row signal include the start identification signal K1 and the cutoff identification signal K2. The non-identification signals in each row signal include the control package signal, the video line package signal, and the idle package signal. In an embodiment of the present disclosure, when the transmitting unit uses the first linear feedback shift register to scramble the signal to be transmitted, only the non-identification signals in the signal to be transmitted are scrambled, and the identification signals in the signal to be transmitted are not scrambled. Therefore, the scrambled signal may include identification signals and scrambled non-identification signals.

As an example, in an embodiment of the present disclosure, each frame signal may include at least one first identification signal sequentially arranged in time domain, and the number of first identification signals in the scrambled signal transmitted by each transmitting unit is the same. That is, when the scrambled signal transmitted by one of the transmitting units includes five first identification signals, the scrambled signals transmitted by other transmitting units also include five first identification signals. The first identification signal is configured to indicate the linear feedback shift register to perform a reset operation, and the receiving unit outputs a display signal to the display panel after each collective reset operation is completed. It should be noted that the collective reset operation may represents that all of the linear feedback shift registers of the source driver perform reset operations indicated by the first identification signals in the same order.

In an embodiment, there may also be one first identification signal of the at least one first identification signal between any two adjacent frames of signal.

Figure 7:
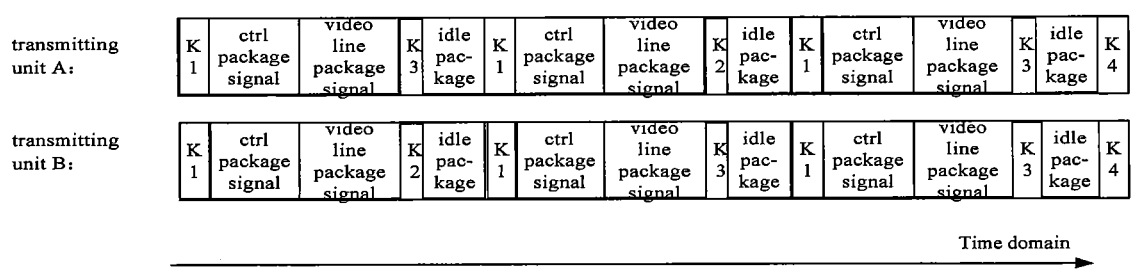
FIG. 7 is a schematic diagram of two frames of signal to be transmitted by two transmitting units according to an embodiment of the present disclosure.

FIG. 7 is a schematic diagram of two frames of signal to be transmitted by two transmitting units according to an embodiment of the present disclosure. As shown in FIG. 7, the two transmitting units include a transmitting unit A and a transmitting unit B. Each frame of signal to be transmitted by each transmitting unit includes a plurality of cutoff identification signals K2. Among the plurality of cutoff identification signals K2, there is at least one target cutoff identification signal, and each target cutoff identification signal is the first identification signal K3. That is, at least one first identification signal K3 exists in the plurality of cutoff identification signals K2, and the cutoff identification signal K2 is only configured to indicate the cutoff position of the row signal. However, the first identification signal K3 may be configured to not only indicate the cutoff position of the row signal, but also indicate the linear feedback shift register to perform a reset operation, and indicate the receiving unit to output a display signal to the display panel after each collective reset operation is completed. Therefore, the signal to be transmitted by each transmitting unit before being scrambled may include: a plurality of signal segments and at least one first identification signal, wherein the plurality of signal segments before scrambling are sequentially arranged in time domain, and there is one first identification signal of the at least one first identification signal between any two adjacent signal segments in the plurality of signal segments before scrambling.

When step 401 is performed, the transmitting unit may use a first linear feedback shift register in the transmitting unit to sequentially scramble the non-identification signals in each of the signal segments to be transmitted, to obtain a scrambled signal. The scrambled signal includes: a plurality of scrambled signal segments and at least one first identification signal. The plurality of scrambled signal segments are sequentially arranged in time domain, and there is one first identification signal of the at least one first identification signal between any two adjacent signal segments in the plurality of scrambled signal segments. When the transmitting unit scans the signal to be transmitted with the first linear feedback shift register and scrambles the signal to be transmitted, if the first linear feedback shift register scans the first identification signal, the first linear feedback shift register performs a reset operation. After the reset operation is completed, the signal after the first identification signal is continuously scanned and scrambled, thereby realizing that the signal to be transmitted by each transmitting unit is divided into a plurality of signal segments, and the plurality of signal segments are scrambled separately.

In an embodiment, on the premise that the signal segments to be transmitted by each transmitting unit are scrambled, the first identification signals may be disposed at different time domain positions in the signals to be transmitted by any two transmitting units (That is, the first identification signals in the signals to be transmitted by any two transmitting units are disposed at different positions of video thread). That is, as shown in FIG. 7, the positions in time domain of the first one of the first identification signals in the signals to be transmitted by the transmitting unit A and the transmitting unit B are different, so that the difference between the plurality of signal segments divided by the first identification signals K3 of the transmitting unit A and the transmitting unit B is large. For example, the signal segments in the transmitting unit A are long, and the signal segments in the transmitting unit B are short. In this way, when the signal segments to be transmitted are scrambled, the difference between the signals to be scrambled is large, further making the difference of the scrambled signals larger, thereby preventing electromagnetic interference between signals during signal transmission.

In an embodiment, the plurality of receiving units are connected one-to-one with the plurality of columns of pixel units in the display panel, each pixel unit including a thin film transistor and a pixel electrode connected to each other. In an embodiment of the present disclosure, the first linear feedback shift registers of two transmitting units corresponding to two receiving units connected to any two adjacent columns of pixel units are different, that is, two first linear feedback shift registers that will scramble two similar signals to be transmitted are set as different linear feedback shift registers. Since the signals obtained by scrambling the same signal by different linear feedback shift registers are different, the signals that will be input to adjacent two columns of pixels have a small degree of electromagnetic interference during transmission.

It should also be noted that in the process of transmitting the scrambled signal to the receiving unit, the identification signal in the scrambled signal may not be received by the receiving unit. Therefore, in order to ensure that the identification signal may be effectively received by the receiving unit, in the embodiments of the present disclosure, each of the identification signals in each of the row signals may be set to include at least eleven consecutive bits. In the related art, each identification signal includes ten bits, and in the embodiments of the present disclosure, the number of bits of each identification signal is greater than ten. If the first ten bits of the identification signal are not received and the bits after the tenth bit are received, the receiving unit may recover the first ten bits that are not received based on the received bits after the tenth bit, thereby determining the identification signal. As another example, if the receiving unit makes a misjudgment of the first ten bits, the receiving unit can correct the first ten bits based on the bits after the tenth bit, thereby accurately identifying the identification signal. In addition, since the number of bits of the identification signal in the embodiments of the present disclosure is greater than the number of bits of the identification signal in the related art, more bits in the embodiments of the present disclosure may be combined to obtain a larger variety of identification signals, thereby further identifying relevant information in the signal transmission process.

As an example, each identification signal may comprise four consecutive bit units, and each bit unit includes ten bits. That is, each identification signal in an embodiment of the present disclosure may include forty bits. When the receiving unit does not receive the previous one or more bit units, the identification signal may be determined by the following bit units.

In an embodiment, the receiving unit can easily identify the identification signal when there are at least two bits of different values in the identification signal. Therefore, in an embodiment of the present disclosure, at least two bits of different values may be set in each bit unit. Further, each of the identification signals may include six consecutive bits of the same value. When receiving and identifying the identification signal, the receiving unit may determine whether the identification signal is received by determining whether six consecutive bits of the same value are received.

It should be noted that each frame signal in FIG. 7 includes a plurality of row signals consecutive in time domain, and may further include a frame end identification signal K4 after the plurality of row signals.

As an example, Table 1 shows that each identification signal in the signal to be transmitted by each transmitting unit includes four bit units. As shown in Table 1, the value of each bit in the embodiment of the present disclosure is a binary number, and in order to ensure that there are at least two bits of different values in each bit unit, two of the four bit units may be set mutually exclusive, and the other two bit units are also mutually exclusive. For example, among the four bit units of K1, the bit unit (0111111010) and the bit unit (1000000101) are mutually exclusive, and the bit unit (1010101000) and the bit unit (0101010111) are mutually exclusive.

In an embodiment, K1 may be composed of a bit unit (0111111010), a bit unit (1000000101), a bit unit (1010101000), and a bit unit (0101010111) sequentially arranged in time domain, or K1 may be composed of a bit unit (0111111010), a bit unit (0101010111), a bit unit (1010101000) and a bit unit (1000000101) sequentially arranged in time domain. It should be noted that the arrangement order of the four bit units shown in Table 1 in the embodiment of the present disclosure is exemplary, and is not restrictive. The four bit units included in each identification signal may adopt other arrangement orders than those shown in Table 1.

TABLE 1

| identification signal | four bit units | | | |
| --- | --- | --- | --- | --- |
| K1 | 0111111010 | 1010101000 | 1000000101 | 0101010111 |
| K2 | 0111111011 | 1011100000 | 1000000100 | 0100011111 |
| K3 | 0111111001 | 1001110000 | 1000000110 | 0110001111 |
| K4 | 0111111000 | 1000111000 | 1000000111 | 0111000111 |

At step 402, the transmitting unit encodes the scrambled signal to obtain an encoded signal.

As an example, in order to increase the rate of signal transmission, before transmitting the scrambled signal, the transmitting unit may also use an 8*b*/10*b* encoding method (that is, encoding 8-bit data into 10-bit data) to encode the scrambled signal to obtain the encoded signal. As an example, in the process of encoding, all identification signals are not encoded, that is, the signals to be encoded are non-identification signals.

At step 403, the transmitting unit transmits the encoded signal to the receiving unit.

After the transmitting unit obtains the encoded signal, the encoded signal may be transmitted to the corresponding receiving unit through a path established between the transmitting unit and the corresponding receiving unit. It should be noted that each of the plurality of transmitting units may transmit the signal encoded by each transmitting unit to the receiving unit corresponding to each transmitting unit in parallel.

It should be noted that, in the process of receiving the encoded signal, if the receiving unit detects the first identification signal, the receiving unit may control the second linear feedback shift register in the receiving unit based on the received first identification signal to perform a reset operation. Since a plurality of transmitting units in the timing controller simultaneously transmit signals to a plurality of receiving units in the source driver, each receiving unit can control the second linear feedback shift register of the receiving unit based on the first identification signal in the received signal to perform a reset operation.

At step 404, the receiving unit decodes the received encoded signal to obtain a decoded signal. The decoded signal corresponds to the scrambled signal obtained in step 401.

After receiving the encoded signal, the receiving unit may decode the encoded signal by using an 8*b*/10*b* decoding method (that is, decoding 10-bit data into 8-bit data), and obtain the scrambled signal obtained in step 401.

At step 405, the receiving unit descrambles the decoded signal with the second linear feedback shift register in the receiving unit to obtain a descrambled signal. The descrambled signal corresponds to the signal before scrambling in the transmitting unit.

It should be noted that the encoding and decoding processes in steps 303 and 404 are optional. The scrambled signal may be transmitted directly from the transmitting unit to the receiving unit without being encoded. In this case, the second linear feedback shift register directly descrambles the signal received by the receiving unit.

The receiving unit may descramble the decoded signal (i.e., the scrambled signal) with the second linear feedback shift register to obtain the signal before scrambling (i.e., the signal to be transmitted by a transmitting unit corresponding to the receiving unit). In this way, the transmitting unit successfully transmits the signal to be transmitted to the corresponding receiving unit. As an example, a scrambling order of the signals by the first linear feedback shift register may be opposite to a descrambling order of the signals by the second linear feedback shift register.

In an embodiment, since the second linear feedback shift register in each receiving unit descrambles the signal scrambled by the first linear feedback shift register in the transmitting unit corresponding to the receiving unit, when the first linear feedback shift registers in two transmitting units are different, the second linear feedback shift registers in the corresponding two receiving units are also different. The signal transmission method provided by the embodiments of the present disclosure is capable of generating an attenuation of about 7 decibels (dB) at the peak spectrum.

At step 406, after each collective reset operation is completed, the receiving unit outputs a display signal to the display panel based on the signal before scrambling.

When all of the second linear feedback shift registers in the source driver complete the reset operation indicated by the first identification signal in the same order, each receiving unit can determine that a collective reset operation has been completed. At this time, each receiving unit can output a display signal to the display panel based on the signal before scrambling descrambled by itself.

As an example, when the receiving unit 1 completes the reset operation indicated by the first one of the first identification signals, the receiving unit 1 completes one reset operation, and the receiving unit 1 needs to determine whether all other receiving units in the source driver complete the reset operation indicated by the received first one of the first identification signals, that is, whether other receiving units have completed one reset operation. If the receiving unit 1 determines that all of the receiving units have completed one reset operation, the receiving unit 1 can output a display signal to the display panel. If the receiving unit 1 determines that some of the receiving units have not completed one reset operation, then the receiving unit 1 cannot output a display signal to the display panel, and the receiving unit will not output a display signal to the display panel until all receiving units complete one reset operation.

When the receiving unit 1 completes the reset operation indicated by the second one of the first identification signals, the receiving unit 1 completes two reset operations, and the receiving unit 1 needs to determine whether all other receiving units in the source driver complete the reset operation indicated by the received second one of the first identification signals, that is, whether other receiving units have completed two reset operations. If the receiving unit 1 determines that all of the receiving units have completed two reset operations, the receiving unit 1 can output a display signal to the display panel. If the receiving unit 1 determines that some of the receiving units have not completed two reset operations, then the receiving unit 1 cannot output a display signal to the display panel, and the receiving unit will not output a display signal to the display panel until all receiving units complete two reset operations.

It should be noted that the sequence of the steps of the signal transmission method provided by the embodiments of the present disclosure may be appropriately adjusted, or steps may be added or omitted according to actual requirements. Any method that may be easily conceived by those skilled in the art within the technical scope of the present disclosure is intended to be included within the scope of the present disclosure.

In summary, in the signal transmission method provided by embodiments of the present disclosure, when the plurality of receiving units receive the scrambled signals at different time, the plurality of receiving units receive the first identification signals at different time. After performing the reset operation based on the first identification signal, each receiving unit will not output the display signal to the display panel until other receiving units complete the reset operation. Therefore, the time difference between the output signals of the plurality of receiving units to the display panel is reduced, and the display effect of the display panel is improved.

Figure 8:
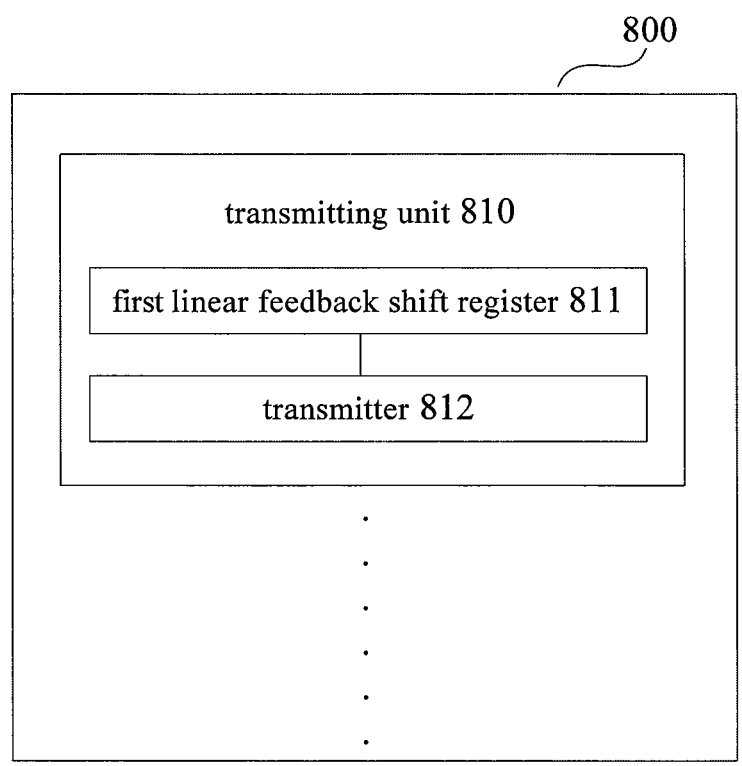
FIG. 8 is a schematic structural diagram of a timing controller according to an embodiment of the present disclosure.

FIG. 8 is a schematic structural diagram of a timing controller 800 according to an embodiment of the present disclosure. The timing controller 800 may be implemented as the timing controller 110 of FIG. 1 and includes a plurality of transmitting units 810. Only one transmitting unit 810 is shown in FIG. 8. The plurality of transmitting units are in one-to-one correspondence with the plurality of receiving units of the source driver. Each of the transmitting units includes a first linear feedback shift register and each of the receiving units includes a second linear feedback shift register. As shown in FIG. 8, the transmitting unit 810 can include a first linear feedback shift register 811 and a transmitter 812.

The first linear feedback shift register 811 is configured to scramble a signal to be transmitted to obtain a scrambled signal. Each frame of signal in the scrambled signal includes at least one first identification signal sequentially arranged in time domain, and a number of the first identification signals in the scrambled signal is equal to a number of the first identification signals in the scrambled signals of other transmitting units in the plurality of transmitting units.

The transmitter 812 is configured to transmit the scrambled signal to a corresponding receiving unit, so that the corresponding receiving unit outputs a display signal to a display panel based on the scrambled signal.

The first identification signal is configured to indicate the first linear feedback shift register and the second linear feedback shift register to perform a reset operation, and after each collective reset operation is completed, the corresponding receiving unit outputs the display signal to the display panel; the collective reset operation represents that all of the second linear feedback shift registers of the source driver perform reset operations indicated by the first identification signals in the same order.

In an embodiment, the first linear feedback shift register 811 may be further configured to: scramble the non-identification signal in the signal to be transmitted to obtain the scrambled signal, the scrambled signal comprises: an identification signal and a scrambled non-identification signal.

In an embodiment, the signal obtained by scrambling the signal X with the first linear feedback shift register is: $X^{16}+X^5+X^4+X^3+1$, $X^{24}+X^4+X^3+X+1$ and $X^{32}+X^7+X^5+X^3+X^2+X+1$.

In an embodiment, the signal to be transmitted may include: a plurality of signal segments before scrambling and the at least one first identification signal, the plurality of signal segments before scrambling are sequentially arranged in time domain, and there is one first identification signal of the at least one first identification signal between any two adjacent signal segments of the plurality of signal segments before scrambling. In this case, the first linear feedback shift register 811 may be further configured to: scramble the non-identification signal in each of the plurality of signal segments before scrambling in sequence to obtain the scrambled signal, wherein the scrambled signal comprises: a plurality of scrambled signal segments and the at least one first identification signal, the plurality of scrambled signal segments are sequentially arranged in time domain, and there is one first identification signal of the at least one first identification signal between any two adjacent signal segments of the plurality of scrambled signal segments.

In an embodiment, in the signals to be transmitted of any two of the transmitting units, positions of the first identification signals in time domain are different.

In an embodiment, the plurality of receiving units are connected one-to-one with the plurality of columns of pixel units in the display panel. The first linear feedback shift registers in two transmitting units which correspond to two receiving units connected with any two adjacent columns of the pixel units are different, for example, which use different multi-order polynomials.

In an embodiment, the signal to be transmitted includes a plurality of frames of signal. Each frame of the plurality of frames of signal includes: a plurality of row signals. Each of the plurality of row signals includes: a start identification signal, a cutoff identification signal, a control package signal, a video line package signal and an idle package. The start identification signal is configured to indicate a start position of each of the row signals, and the cutoff identification signal is configured to indicate a cutoff position of each of the row signals. There is at least one target cutoff identification signal in the plurality of cutoff identification signals of each frame of signal, and each target cutoff identification signal is used as the first identification signal.

In an embodiment, each of the identification signals in each of the row signals includes at least eleven consecutive bits.

In an embodiment, each of the identification signals includes four consecutive bit units, each of the bit units includes ten bits.

In an embodiment, there are at least two bits of different values in each of the bit units.

In an embodiment, there are six consecutive bits of the same value in each of the identification signals.

In an embodiment, the scrambled signal includes: the first identification signal between any two adjacent frames of the scrambled signal.

In summary, in the transmitting unit provided by the embodiment of the present disclosure, each frame of signal in the signal scrambled by the first linear feedback shift register includes at least one first identification signal. When the plurality of receiving units receive the scrambled signals at different time, the plurality of receiving units receive the first identification signals at different time. The receiving units output display signals to the display panel after each collective reset operation is completed. That is, after performing the reset operation based on the first identification signal, each receiving unit will not output the display signal to the display panel until other receiving units complete the reset operation. Therefore, the time difference between the output signals of the plurality of receiving units to the display panel is reduced, and the display effect of the display panel is improved.

Figure 9:
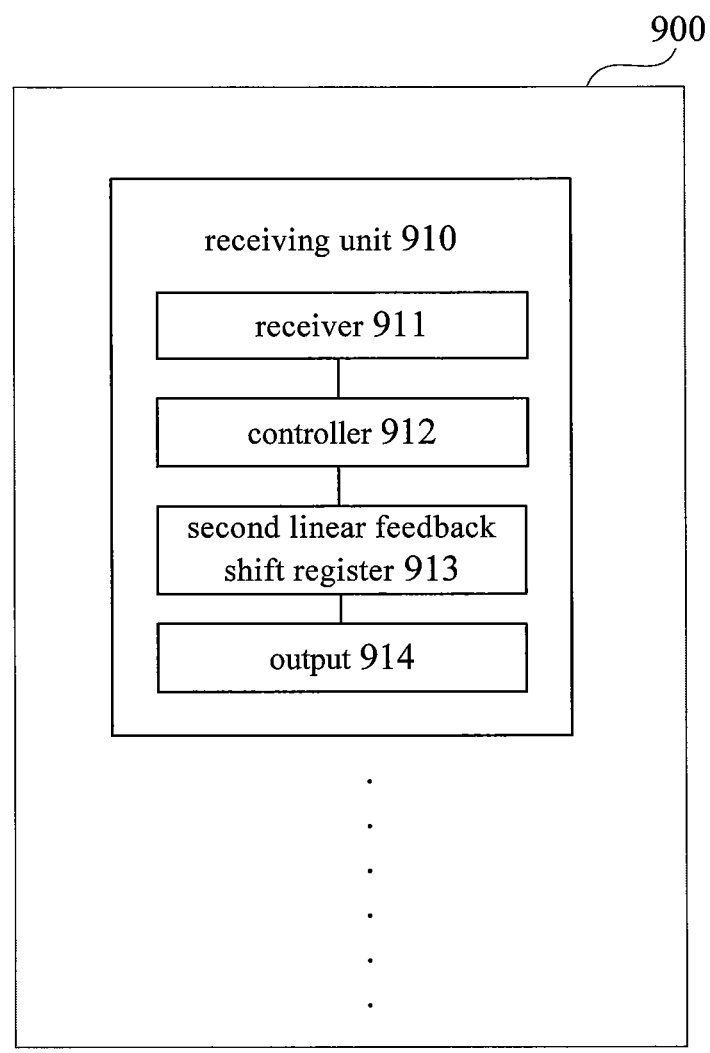
FIG. 9 is a schematic structural diagram of a source driver according to an embodiment of the present disclosure.

FIG. 9 is a schematic structural diagram of a source driver 900 according to an embodiment of the present disclosure. The source driver 900 may be implemented as the source driver 120 shown in FIG. 1 and includes a plurality of receiving units 910. FIG. 9 shows only one receiving unit 910. The receiving unit 910 may be any one of the plurality of receiving units of the source driver shown in FIG. 1. The plurality of receiving units are in one-to-one correspondence with the plurality of transmitting units of the timing controller. Each of the transmitting units includes a first linear feedback shift register and each of the receiving units includes a second linear feedback shift register. As shown in FIG. 9, the receiving unit 910 can include a receiver 911, a controller 912, a second linear feedback shift register 913, and an output 914.

The receiver 911 is configured to receive the scrambled signal transmitted by the corresponding transmitting unit. Each frame of the scrambled signal includes at least one first identification signal sequentially arranged in time domain, and a number of the first identification signals in the scrambled signal is equal to a number of the first identification signals in the scrambled signals received by other receiving units in the plurality of receiving units. The first identification signal is configured to indicate the first and second linear feedback shift registers to perform a reset operation, and after each collective reset operation is completed, the receiving unit outputs a display signal to the display panel, the collective reset operation representing that all of the second linear feedback shift registers of the source driver perform reset operations indicated by the first identification signals in the same order.

The controller 912 is configured to control the second linear feedback shift register in the receiving unit to perform a reset operation based on the first identification signal in the scrambled signal.

The second linear feedback shift register 913 is configured to descramble the scrambled signal to obtain a signal before scrambling.

The output 914 is configured to output a display signal to the display panel based on the signal before scrambling after each collective reset operation is completed.

In summary, in the receiving unit provided by the embodiment of the present disclosure, when the plurality of receiving units receive the scrambled signals at different time, the plurality of receiving units receive the first identification signals at different time. The output outputs the display signal to the display panel after each collective reset operation is completed. That is, after controlling the second linear feedback shift register to perform the reset operation based on the first identification signal, the controller in each receiving unit will not output the display signal to the display panel until other receiving units complete the reset operation. Therefore, the time difference between the output signals of the plurality of receiving units to the display panel is reduced, and the display effect of the display panel is improved.

In an embodiment, the scrambled signal is a signal obtained by scrambling a non-identification signal in a signal to be transmitted using a first linear feedback shift register of the transmitting unit. The scrambled signal includes an identification signal and a scrambled non-identification signal. The second linear feedback shift register 913 can also be configured to descramble the received signal to obtain a descrambled signal corresponding to the signal before scrambling.

In an embodiment, the received signal is a signal obtained by scrambling the signal X with a first linear feedback shift register, such as $X^{16}+X^5+X^4+X^3+1$, $X^{24}+X^4+X^3+X+1$ and $X^{32}+X^7+X^5+X^3+X^2+X+1$. A scrambling order of the signals by the first linear feedback shift register is opposite to a descrambling order of the signals by the second linear feedback shift register.

In an embodiment, the received signal includes: a plurality of scrambled signal segments and the at least one first identification signal, wherein the plurality of scrambled signal segments are sequentially arranged in time domain, and there is one first identification signal of the at least one first identification signal between any two adjacent signal segments of the plurality of scrambled signal segments.

The second linear feedback shift register 813 is further configured to: descramble the non-identification signal in each of the plurality of scrambled signal segments in sequence to obtain a descrambled signal that corresponds to the signal before scrambling; the descrambled signal comprises: a plurality of signal segments before scrambling and the at least one first identification signal, wherein the plurality of signal segments before scrambling are sequentially arranged in time domain, and there is one first identification signal of the at least one first identification signal between any two adjacent signal segments of the plurality of signal segments before scrambling.

In an embodiment, in the signals received by any two of the receiving units, positions of the first identification signals in time domain are different.

In an embodiment, the plurality of receiving units are connected one-to-one with the plurality of columns of pixel units in the display panel. The second linear feedback shift registers in two receiving units connected with any two adjacent columns of the pixel units are different, for example, which use different multi-order polynomials.

In an embodiment, the signal to be transmitted includes a plurality of frames of signal. Each frame of the plurality of frames of signal includes: a plurality of row signals. Each of the plurality of row signals includes: a start identification signal, a cutoff identification signal, a control package signal, a video line package signal and an idle package. The start identification signal is configured to indicate a start position of each of the row signals, and the cutoff identification signal is configured to indicate a cutoff position of each of the row signals;

there is at least one target cutoff identification signal in the plurality of cutoff identification signals of each of the plurality of frames of signal, and each target cutoff identification signal is used as the first identification signal.

In an embodiment, each of the identification signals in each of the row signals includes at least eleven consecutive bits.

In an embodiment, each of the identification signals includes four consecutive bit units, and each of the bit units includes ten bits.

In an embodiment, there are at least two bits of different values in each of the bit units.

In an embodiment, there are six consecutive bits of the same value in each of the identification signals.

In an embodiment, the scrambled signal includes: the first identification signal between any two adjacent frames of the scrambled signal.

In summary, in the receiving unit provided by the embodiment of the present disclosure, when the plurality of receiving units receive the scrambled signals at different time, the plurality of receiving units receive the first identification signals at different time. The output outputs the display signal to the display panel after each collective reset operation is completed. That is, after controlling the second linear feedback shift register to perform the reset operation based on the first identification signal, the controller in each receiving unit will not output the display signal to the display panel until other receiving units complete the reset operation. Therefore, the time difference between the output signals of the plurality of receiving units to the display panel is reduced, and the display effect of the display panel is improved.

The embodiments illustrated in FIG. 2, FIG. 3, and FIG. 4 may be implemented in whole or in part by software, hardware, firmware, or any combination thereof. When implemented in software, it may be implemented in whole or in part in the form of a computer program product comprising one or more computer instructions. When the computer program instructions are loaded and executed on a computer, the processes or functions described in accordance with embodiments of the present disclosure are implemented in whole or in part. The computer may be a programmable device, and the computer instructions may be stored in a readable storage medium of the computer. The computer readable storage medium may be any available medium that may be accessed by a computer. The available medium may be a magnetic medium, an optical medium, or a semiconductor medium or the like.

The embodiments of the signal transmission method, the embodiments of the transmitting unit, the embodiments of the receiving unit and the embodiments of the display device according to the present disclosure can all be referred to each other, which is not limited herein.

The sequence of the steps of the signal transmission method provided by the embodiments of the present disclosure may be appropriately adjusted, or steps may be added or omitted according to actual requirements. Any method that may be easily conceived by those skilled in the art within the technical scope of the present disclosure is intended to be included within the scope of the present disclosure.

A person of ordinary skill in the art can understand that all or part of the steps of the above embodiments may be completed by hardware, or may be completed by a program which indicates related hardware. The program may be stored in a computer readable storage medium. The storage medium may be a read only memory, a magnetic disk or an optical disk or the like.

The above embodiments are optional embodiments of the present application, and are not intended to limit the application. Any modifications, equivalent substitutions, improvements made within the spirit and principles of this application are intended to be included within the scope of the present application.

The invention claimed is:

1. A signal transmission method applied to one of a plurality of transmitting units of a timing controller, the plurality of transmitting units are in one-to-one correspondence with a plurality of receiving units of a source driver, each of the plurality of transmitting units comprising a first linear feedback shift register and each of the plurality of receiving units comprising a second linear feedback shift register, the method comprising:

scrambling a signal to be transmitted by using the first linear feedback shift register to obtain a scrambled signal, wherein each frame of the scrambled signal comprises at least one first identification signal sequentially arranged in time domain, and a number of the first identification signals in the scrambled signal is equal to a number of the first identification signals in the scrambled signals of other transmitting units in the plurality of transmitting units; and transmitting the scrambled signal to a corresponding receiving unit, so that the corresponding receiving unit outputs a display signal to a display panel based on the scrambled signal, wherein the first identification signal is configured to indicate the first and second linear feedback shift registers to perform a reset operation, and after each collective reset operation is completed, the corresponding receiving unit outputs the display signal to the display panel, the collective reset operation representing that all of the second linear feedback shift registers of the source driver perform reset operations indicated by the first identification signals in a same order.

2. The method according to claim 1, wherein said scrambling the signal to be transmitted to obtain the scrambled signal comprises:

scrambling a non-identification signal in the signal to be transmitted with the first linear feedback shift register in a transmitting unit of the plurality of transmitting units to obtain the scrambled signal, the scrambled signal comprising an identification signal and a scrambled non-identification signal, wherein the signal to be transmitted is scrambled by the first linear feedback shift register using one of multi-order polynomials $X^{16}+X^5+X^4+X^3+1$, $X^{24}+X^4+X^3+X+1$ or $X^{32}+X^7+X^5+X^3+X^2+X+1$.

3. The method according to claim 2, wherein the signal to be transmitted comprises:

a plurality of signal segments before scrambling and the at least one first identification signal, wherein the plurality of signal segments before scrambling are sequentially arranged in time domain, and one first identification signal of the at least one first identification signal is between two adjacent signal segments of the plurality of signal segments before scrambling, and wherein the scrambling the signal to be transmitted to obtain the scrambled signal comprises:

scrambling the non-identification signal in each of the plurality of signal segments before scrambling in sequence to obtain the scrambled signal, wherein the scrambled signal comprises:

a plurality of scrambled signal segments and the at least one first identification signal, wherein the plurality of scrambled signal segments are sequentially arranged in time domain, and wherein one first identification signal of the at least one first identification signal is between two adjacent signal segments of the plurality of scrambled signal segments.

4. The method according to claim 3, wherein the signal to be transmitted comprises: a plurality of frames of signal, wherein each of the plurality of frames of signal comprises a plurality of row signals, wherein each of the plurality of row signals comprises: a start identification signal and a cutoff identification signal as identification signals, and a control package signal, a video line package signal and an idle package as non-identification signals,
   wherein the start identification signal is configured to indicate a start position of each of the row signals,
   wherein the cutoff identification signal is configured to indicate a cutoff position of each of the row signals; and
   wherein at least one target cutoff identification signal is in a plurality of cutoff identification signals of each frame of signal, and each target cutoff identification signal is used as the first identification signal.

5. The method according to claim 2,
   wherein the plurality of receiving units are connected one-to-one with a plurality of columns of pixel units in the display panel, and
   wherein the first linear feedback shift registers in two transmitting units which correspond to two receiving units connected with two adjacent columns of the pixel units are different.

6. A signal transmission method applied to one of a plurality of receiving units of a source driver, the plurality of receiving units are in one-to-one correspondence with a plurality of transmitting units of a timing controller, each of the transmitting units comprising a first linear feedback shift register and each of the plurality of receiving units comprising a second linear feedback shift register, the method comprising:
   receiving a signal transmitted by a corresponding transmitting unit, wherein the signal is a scrambled signal obtained by scrambling a signal to be transmitted with the first linear feedback shift register of the corresponding transmitting unit, wherein each frame of the scrambled signal comprises at least one first identification signal sequentially arranged in time domain, wherein a number of the first identification signals in the scrambled signal is equal to a number of the first identification signals in the scrambled signals received by other receiving units in the plurality of receiving units, wherein the first identification signal is configured to indicate the first and second linear feedback shift registers are configured to perform a reset operation, and after each collective reset operation is completed, the receiving unit is configured to output a display signal to a display panel, the collective reset operation representing that all of the second linear feedback shift registers of the source driver perform reset operations indicated by the first identification signals in a same order;
   controlling the second linear feedback shift register in the receiving unit to perform the reset operation based on the received first identification signal;
   descrambling the scrambled signal to obtain a signal before scrambling; and
   outputting the display signal to the display panel based on the signal before scrambling after each collective reset operation is completed.

7. The method according to claim 6, wherein the scrambled signal is a signal obtained by scrambling a non-identification signal in the signal to be transmitted using the first linear feedback shift register of a transmitting unit of the plurality of transmitting units, the scrambled signal comprising an identification signal and a scrambled non-identification signal, and wherein descrambling the scrambled signal to obtain the signal before scrambling comprises:
   descrambling the scrambled signal to obtain the signal before scrambling with the second linear feedback shift register in the receiving unit,
   wherein the signal to be transmitted is scrambled by the first linear feedback shift register using one of multi-order polynomials $X^{16}+X^5+X^4+X^3+1$, $X^{24}+X^4+X^3+X+1$ or $X^{32}+X^7+X^5+X^3+X^2+X+1$, and
   wherein a scrambling order of the signals by the first linear feedback shift register is opposite to a descrambling order of the signals by the second linear feedback shift register.

8. The method according to claim 7, wherein the scrambled signal comprises:
   a plurality of scrambled signal segments and the at least one first identification signal,
   wherein the plurality of scrambled signal segments are sequentially arranged in time domain, and one first identification signal of the at least one first identification signal is between two adjacent signal segments of the plurality of scrambled signal segments; and
   wherein descrambling the scrambled signal to obtain the signal before scrambling comprises descrambling the non-identification signal in each of the plurality of scrambled signal segments in sequence to obtain the signal before scrambling,
   wherein the signal before scrambling comprises a plurality of signal segments before scrambling and the at least one first identification signal,
   wherein the plurality of signal segments before scrambling are sequentially arranged in time domain, and
   wherein one first identification signal of the at least one first identification signal is between two adjacent signal segments of the plurality of signal segments before scrambling.

9. The method according to claim 8,
   wherein the signal to be transmitted comprises a plurality of frames of signal across a plurality of frames of image, each of the plurality of frames of signal comprising a plurality of row signals,
   wherein each of the plurality of row signals comprises a start identification signal and a cutoff identification signal as identification signals, and a control package signal, a video line package signal and an idle package as non-identification signals,
   wherein the start identification signal is configured to indicate a start position of each of the row signals,
   wherein the cutoff identification signal is configured to indicate a cutoff position of each of the row signals; and
   wherein there is at least one target cutoff identification signal in a plurality of cutoff identification signals of each frame of signal, and each target cutoff identification signal is used as the first identification signal.

10. The method according to claim 7, wherein the plurality of receiving units are connected one-to-one with a plurality of columns of pixel units in the display panel, and the second linear feedback shift registers in two receiving units connected by two adjacent columns of the pixel units are different.

11. A timing controller comprising a plurality of transmitting units, the plurality of transmitting units are in one-to-one correspondence with a plurality of receiving units of a source driver, each of the transmitting units comprising:
- a first linear feedback shift register configured to scramble a signal to be transmitted to obtain a scrambled signal, wherein each frame of the scrambled signal comprises at least one first identification signal sequentially arranged in time domain, and wherein a number of the first identification signals in the scrambled signal is equal to a number of the first identification signals in the scrambled signals of other transmitting units in the plurality of transmitting units; and
- a transmitter configured to transmit the scrambled signal to a corresponding receiving unit, so that the corresponding receiving unit outputs a display signal to a display panel based on the scrambled signal, wherein the first identification signal is configured to indicate the first linear feedback shift register and a second linear feedback shift register comprised by the corresponding receiving unit are configured to perform a reset operation, and after each collective reset operation is completed, the corresponding receiving unit is configured to output the display signal to the display panel, and
- wherein the collective reset operation represents that all of the second linear feedback shift registers of the source driver are configured to perform reset operations indicated by the first identification signals in a same order.

12. The timing controller according to claim 11,
- wherein the first linear feedback shift register is further configured to scramble a non-identification signal in the signal to be transmitted to obtain the scrambled signal, wherein the scrambled signal comprises an identification signal and a scrambled non-identification signal, and
- wherein the signal to be transmitted is scrambled by the first linear feedback shift register using one of multi-order polynomials $X^{16}+X^5+X^4+X^3+1$, $X^{24}+X^4+X^3+X+1$ or $X^{32}+X^7+X^5+X^3+X^2+X+1$.

13. The timing controller according to claim 12,
- wherein the signal to be transmitted comprises a plurality of signal segments before scrambling and the at least one first identification signal,
- wherein the plurality of signal segments before scrambling are sequentially arranged in time domain, and one first identification signal of the at least one first identification signal is between two adjacent signal segments of the plurality of signal segments before scrambling,
- wherein the first linear feedback shift register is further configured to scramble the non-identification signal in each of the plurality of signal segments before scrambling in sequence to obtain the scrambled signal, wherein the scrambled signal comprises a plurality of scrambled signal segments and the at least one first identification signal,
- wherein the plurality of scrambled signal segments are sequentially arranged in time domain, and
- wherein one first identification signal of the at least one first identification signal is between two adjacent signal segments of the plurality of scrambled signal segments.

14. A source driver comprising a plurality of receiving units, wherein the plurality of receiving units are in one-to-one correspondence with a plurality of transmitting units of the timing controller according to claim 11, wherein each of the transmitting units comprising a first linear feedback shift register, wherein each of the receiving units comprising a receiver a controller, a second linear feedback shift register, and an output,
- wherein the receiver is configured to receive a signal transmitted by a corresponding transmitting unit, wherein the signal is a scrambled signal obtained by scrambling a signal to be transmitted with the first linear feedback shift register of the corresponding transmitting unit,
- wherein each frame of the scrambled signal comprises at least one first identification signal sequentially arranged in time domain, and a number of the first identification signals in the scrambled signal is equal to a number of the first identification signals in the scrambled signals received by other receiving units in the plurality of receiving units,
- wherein the first identification signal is configured to indicate the first and second linear feedback shift registers to perform a reset operation, and after each collective reset operation is completed, the receiving unit outputs a display signal to a display panel, the collective reset operation representing that all of the second linear feedback shift registers of the source driver are configured to perform reset operations indicated by the first identification signals in the same order,
- wherein the controller is configured to control the second linear feedback shift register in the receiving unit to perform the reset operation based on the received first identification signal,
- wherein the second linear feedback shift register is configured to descramble the received scrambled signal to obtain a signal before scrambling, and
- wherein the output is configured to output the display signal to the display panel based on the signal before scrambling after each collective reset operation is completed.

15. The source driver according to claim 14,
- wherein the scrambled signal is a signal obtained by scrambling a non-identification signal in the signal to be transmitted using a first linear feedback shift register of the corresponding transmitting unit, the scrambled signal comprising an identification signal and a scrambled non-identification signal,
- wherein the signal to be transmitted is scrambled by the first linear feedback shift register using one of multi-order polynomials $X^{16}+X^5+X^4+X^3+1$, $X^{24}+X^4+X^3+X+1$ or $X^{32}+X^7+X^5+X^3+X^2+X+1$, and
- wherein a scrambling order of the signals by the first linear feedback shift register is opposite to a descrambling order of the signals by the second linear feedback shift register.

16. The source driver according to claim 15,
- wherein the scrambled signal comprises a plurality of scrambled signal segments and the at least one first identification signal,
- wherein the plurality of scrambled signal segments are sequentially arranged in time domain,
- wherein one first identification signal of the at least one first identification signal is between two adjacent signal segments of the plurality of scrambled signal segments,
- wherein the second linear feedback shift register is further configured to descramble the non-identification signal in each of the plurality of scrambled signal segments in sequence to obtain the signal before scrambling, wherein the signal before scrambling comprises a plurality of signal segments before scrambling and the at least one first identification signal, wherein the plurality of signal segments before scrambling are sequentially arranged in time domain, and wherein one first identification signal of the at least one first identification signal is between two adjacent signal segments of the plurality of signal segments before scrambling.

17. The source driver according to claim 16, wherein the signal to be transmitted comprises a plurality of frames of signal across a plurality of frames of image, each of the plurality of frames of signal comprises a plurality of row signals, wherein each of the plurality of row signals comprises a start identification signal and a cutoff identification signal as identification signals, and a control package signal, a video line package signal and an idle package as non-identification signals, wherein the start identification signal is configured to indicate a start position of each of the row signals, wherein the cutoff identification signal is configured to indicate a cutoff position of each of the row signals, and wherein there is at least one target cutoff identification signal in a plurality of cutoff identification signals of each frame of signal, and each target cutoff identification signal is used as the first identification signal.

18. A display device comprising:

a timing controller according to claim 11, and a source comprising a plurality of receiving units, the plurality of receiving units are in one-to-one correspondence with the plurality of transmitting units of the timing controller, each of the transmitting units comprising a first linear feedback shift register, and each of the receiving units comprising a receiver, a controller, a second linear feedback shift register, and an output, wherein the receiver is configured to receive a signal transmitted by a corresponding transmitting unit, wherein the signal is a scrambled signal obtained by scrambling a signal to be transmitted with the first linear feedback shift register of the corresponding transmitting unit, wherein each frame of the scrambled signal comprises at least one first identification signal sequentially arranged in time domain, and a number of the first identification signals in the scrambled signal is equal to a number of the first identification signals in the scrambled signals received by other receiving units in the plurality of receiving units, wherein the first identification signal is configured to indicate the first and second linear feedback shift registers to perform a reset operation, and after each collective reset operation is completed, the receiving unit is configured to output a display signal to a display panel, the collective reset operation representing that all of the second linear feedback shift registers of the source driver are configured to perform reset operations indicated by the first identification signals in the same order, wherein the controller is configured to control the second linear feedback shift register in the receiving unit to perform the reset operation based on the received first identification signal, wherein the second linear feedback shift register is configured to descramble the received scrambled signal to obtain a signal before scrambling, and the output is configured to output the display signal to the display panel based on the signal before scrambling after each collective reset operation is completed.

19. A computer readable non-transitory storage medium, having stored thereon instructions that, when executed on a computer, perform a method according to claim 1.

20. A computer readable non-transitory storage medium, having stored thereon instructions that, when executed on a computer, perform a method according to claim 6.

* * * * *